US006611390B1

(12) United States Patent
Egan

(10) Patent No.: US 6,611,390 B1
(45) Date of Patent: Aug. 26, 2003

(54) METHOD AND APPARATUS FOR IMPROVING SERVO ZONING FOR PRML DETECTED GRAY CODE USING CHANNEL BIT DENSITIES

(75) Inventor: Curtis Egan, Thornton, CO (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 09/712,622

(22) Filed: Nov. 13, 2000

Related U.S. Application Data

(60) Provisional application No. 60/190,402, filed on Mar. 17, 2000.

(51) Int. Cl.[7] ............................................... G11B 27/36
(52) U.S. Cl. .............................. 360/31; 360/48; 360/65; 360/46; 360/77.08; 360/78.14
(58) Field of Search ............................... 360/48, 65, 46, 360/31, 77.08, 78.14, 45, 49

(56) References Cited

U.S. PATENT DOCUMENTS

| 4,750,059 A | * 6/1988 | Syracuse .................... 360/48 |
| 4,755,890 A | 7/1988 | Huber |
| 4,999,720 A | 3/1991 | Wilson et al. |
| 5,301,072 A | 4/1994 | Wilson |
| 5,396,240 A | 3/1995 | Schowe |
| 5,430,581 A | * 7/1995 | Moribe et al. ................ 360/31 |
| 5,936,790 A | 8/1999 | Ho et al. |

OTHER PUBLICATIONS

"PRML detection boosts hard-disk drive capacity" by Fisher et al, IEEE Spectrum, Nov. 1996, pp. 70–76.*

* cited by examiner

Primary Examiner—Alan T Faber
(74) Attorney, Agent, or Firm—Tejpal S. Hansra

(57) ABSTRACT

A method for allocating tracks into servo sector zones in a disk drive such that each zone has an equal range of channel bit densities is provided. In addition, a disk drive having servo sector zones that each have an equal range of channel bit densities is provided. According to the method and apparatus of the present invention, servo sector zones are sized such that the range of servo sector channel bit densities encompassed by each zone is constant from zone to zone. By constraining the range of channel bit densities encompassed by the servo sector zones, the equalization or conditioning of signals derived from the servo sectors can be optimized for a given number of zones. Accordingly, the method and apparatus of the present invention increases the accuracy with which servo sector data is detected while decreasing the complexity of the detector circuit.

35 Claims, 7 Drawing Sheets

METHOD AND APPARATUS FOR IMPROVING SERVO ZONING FOR PRML DETECTED GRAY CODE USING CHANNEL BIT DENSITIES

CROSS REFERENCE TO RELATED APPLICATIONS

Priority is claimed from U.S. Provisional Patent App. No. 60/190,402, filed Mar. 17, 2000 entitled "Servo Zoning for PRML Detected Gray Code" and further identified as the disclosure of which is incorporated herein by reference in its entirety.

FIELD OF THE INVENTION

The present invention relates to establishing the size of servo zones in a disk drive. In particular, the present invention relates to establishing the size of servo zones in a disk drive having a partial response maximum likelihood type detector.

BACKGROUND OF THE INVENTION

Computer disk drives store information on magnetic disks. Typically, the information is stored on each disk in concentric tracks that are divided into servo sectors and data sectors. Information is written to and read from a disk by a transducer head, mounted on an actuator arm capable of moving the transducer head radially over the disk. Accordingly, the movement of the actuator arm allows the transducer head to access different tracks. The disk is rotated by a spindle motor at a high speed, allowing the head to access different sectors on the disk. The transducer head may include separate or integrated read and write heads.

The servo sectors provide information concerning the position of the transducer head with respect to the surface of the disk. In particular, the servo sectors may provide information concerning the particular track and the sector on that track that is being addressed by the transducer head. Because servo sectors are interspersed between data sectors, the disk drive receives information concerning the position of the transducer head over the disk surface intermittently. Typically, the number of servo sectors per track at an inner diameter is the same as the number of servo sectors per track at an outer diameter.

In order to reliably read position information from the servo sectors on a disk, the position information is commonly encoded as "Gray code." In Gray code, only one bit changes between successive code words. By using Gray code, errors can be minimized if it is known that only one bit in the code word is changing.

The signal derived from servo sector Gray code will vary according to its position on the disk. In particular, the amplitude of a servo sector signal derived from a servo sector located at an outer diameter of the disk surface will be greater than the amplitude of a signal derived from a servo sector at an inner diameter of the disk. This variance is due to intersymbol interference. In order to properly decode signals derived from servo sectors associated with tracks at different locations across the disk, adjustments may be made to the detection circuit or algorithm. In particular, different filters or equalizations may be provided to account for expected changes to the signal produced in the transducer head by different servo sectors according to the radius of the track with which the servo sector is associated. For example, the tracks on a disk surface may be considered as a series of zones, each containing the same number of tracks. The detection circuit may adjust, for example, the amount by which a signal is amplified according to the zone in which the servo sector being read is located. In particular, the gain in the detection circuit may be increased for tracks located in a zone at an inner diameter of a disk as compared to a zone located at an outer diameter of a disk. The use of zones allows the detector to accommodate differences in the signal produced by servo sectors at different locations on the disk, while avoiding the complexity of providing a different gain amount or equalization scheme for each track on the disk.

One type of detector that may be used to decode the position information stored in servo sectors is a partial response maximum likelihood (PRML) type detector. In general, PRML type detectors increase the accuracy of the detection circuit, because they allow a sequence of signals or pulses to be considered together, rather than as a series of discrete pulses. The sequence of pulses is then matched to a most likely bit sequence to arrive at a code word. Accordingly, PRML type detectors consider the shape of an entire sequence of pulses. PRML type detectors also allow information to be written at higher bit densities, because the intersymbol interference that results from closely spaced pulses can be accommodated better than with peak detection methods, which require detection of a discrete pulse at each sampling interval.

With respect to servo sector information, which is written at a constant frequency across all the tracks of the disk, the radius of the track from which servo sector information is read may influence not only the amplitude but the shape of the pulse produced in a transducer head by a servo sector. Using conventional zoning methods, such as dividing the tracks into a number of zones having an equal number of tracks, the detection of Gray code using PRML techniques is less than optimal. For instance, where the tracks on the disk are considered as a plurality of zones having an equal number of tracks, the detection of servo sector information may be unreliable in certain of the tracks within a zone. Accordingly, it may be necessary to further subdivide zones, and provide a unique signal conditioner for each of the subzones. Using conventional zoning methods, subzones are created by dividing the number of tracks in a zone by the desired number of subzones to obtain subzones that each have an equal number of tracks. Therefore, the code required in order to implement a PRML system for detecting servo sector information according to conventional methods is relatively complex. This complexity may result in decreases in the performance of the drive, and may require more sophisticated processors and more internal memory in the detector circuit than would otherwise be required. In addition, the large number of zones required to achieve satisfactory detector performance results in increased manufacturing times, because there are a large number of zones to test on each drive.

Accordingly, a need exists for a method of dividing the tracks of a disk drive into servo sector zones that allows for the detection of servo sector information with improved accuracy and reduced overhead requirements. In addition, it would be advantageous to provide a disk drive apparatus having a PRML type detector for detecting servo sector information with improved drive yield. Furthermore, it would be advantageous to provide a method and apparatus that could be implemented at an acceptable cost, and that would be reliable in operation.

SUMMARY OF THE INVENTION

In accordance with the present invention, a method is provided for sizing servo sector zones to optimize the equalization of signals derived from servo sector information in a computer disk drive. In addition, the present invention provides an apparatus having servo sector zones sized so as to optimize the equalization of signals derived from servo sectors. According to the present invention, servo sector zones are sized such that each zone encompasses a like range of channel bit densities.

In accordance with one embodiment of the present invention, a range of channel bit densities across the surface of a magnetic disk in a computer disk drive is calculated. The disk is then divided into a selected number of servo sector zones, each encompassing a like range of channel bit densities. A single signal equalization scheme may then be provided for the detection of signals derived from a single corresponding zone. By sizing servo sector zones to encompass like ranges of channel bit densities, an equal or near equal range of servo sector signal variations is encountered in each zone. This in turn enables servo sector information to be correctly decoded using only a single equalization scheme per zone. Furthermore, the present invention reduces the mean square error of the detector within the borders of any one zone, resulting in increased manufacturing yield.

According to one embodiment of the present invention, the equalization applied to signals derived from a particular zone is optimized for the middle channel bit density value of the zone. According to a further embodiment of the present invention, the equalization applied to signals derived from a particular zone is optimized for a track located in the middle of the zone. According to still another embodiment of the present invention, the equalization of signals derived from a zone is optimized for a track having a channel bit density equal to the average channel bit density of the tracks included in the zone.

Based on the foregoing summary, a number of salient features of the present invention are readily discerned. A method for optimizing the equalization of signals derived from servo sectors on a disk drive is provided. Furthermore, a disk drive apparatus having optimized equalization of signals derived from servo sector information and increased manufacturing yield is provided. The method and apparatus of the present invention allow signals derived from servo sector information to be optimally conditioned for a given number of servo sector zones and a corresponding number of equalization parameters.

Additional advantages of the present invention will become readily apparent from the following discussion, particularly when taken together with the accompanying drawings.

DETAILED DESCRIPTION

Figure 1:
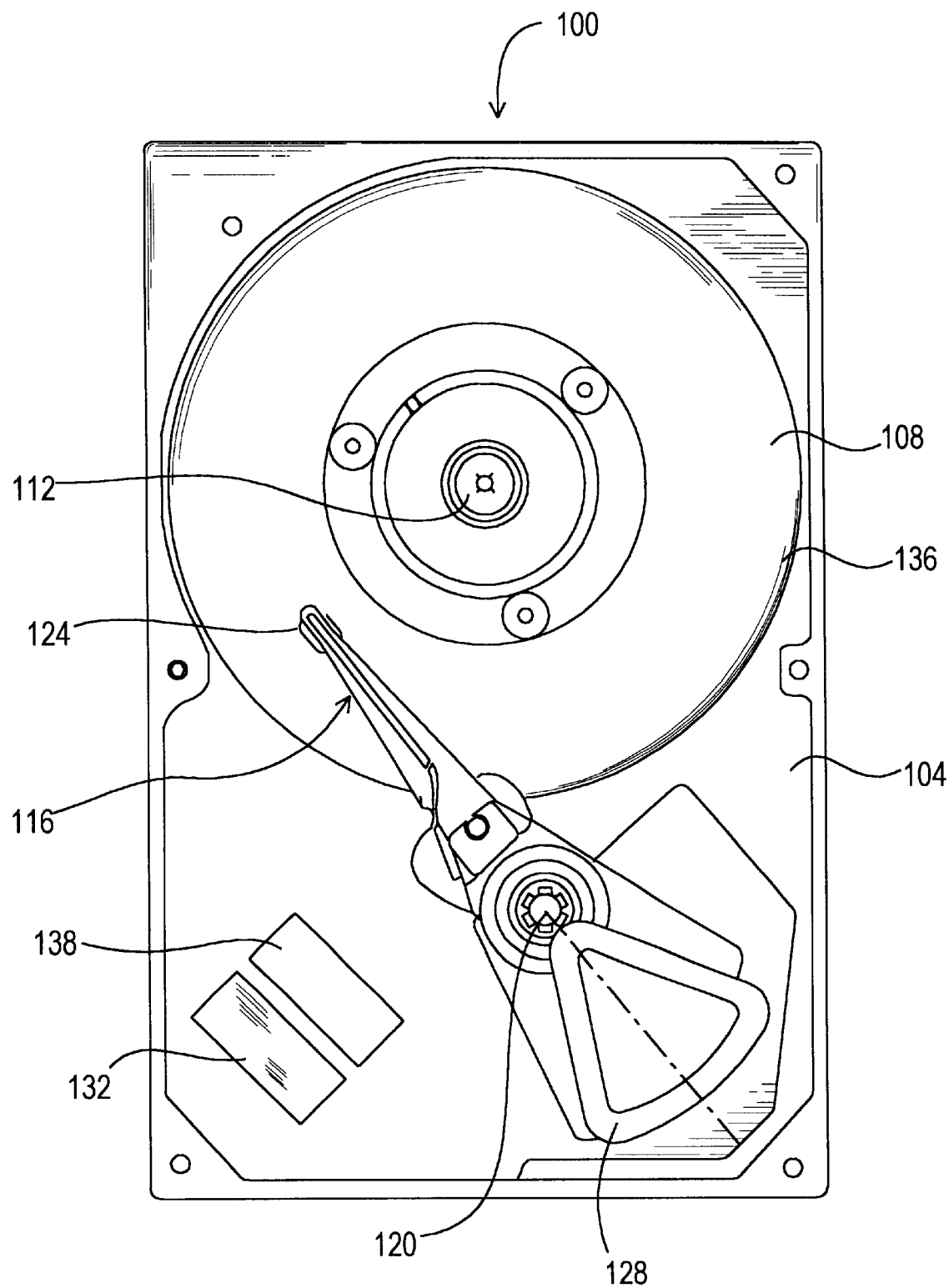
FIG. 1 is a diagrammatic representation of a conventional computer disk drive, with the cover removed.

FIG. 1 illustrates a typical computer disk drive. The disk drive, generally identified by reference number 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 each include a transducer head 124 at a first end, to address each of the surfaces of the magnetic disks 108. A voice coil motor 128 pivots the actuator arm assemblies 116 about the bearing 120 to radially position the transducer heads 124 with respect to the magnetic disks 108. By changing the radial position of the transducer heads 124 with respect to the magnetic disks 108, the t ransducer heads 124 can access different data tracks or cylinders 136 on the magnetic disks 108. The voice coil motor 128 is operated by a controller 132 that is in turn operatively connected to a host computer (not shown). A channel 138 processes information read from the magnetic disks 108 by the transducer heads 124.

Figure 2:
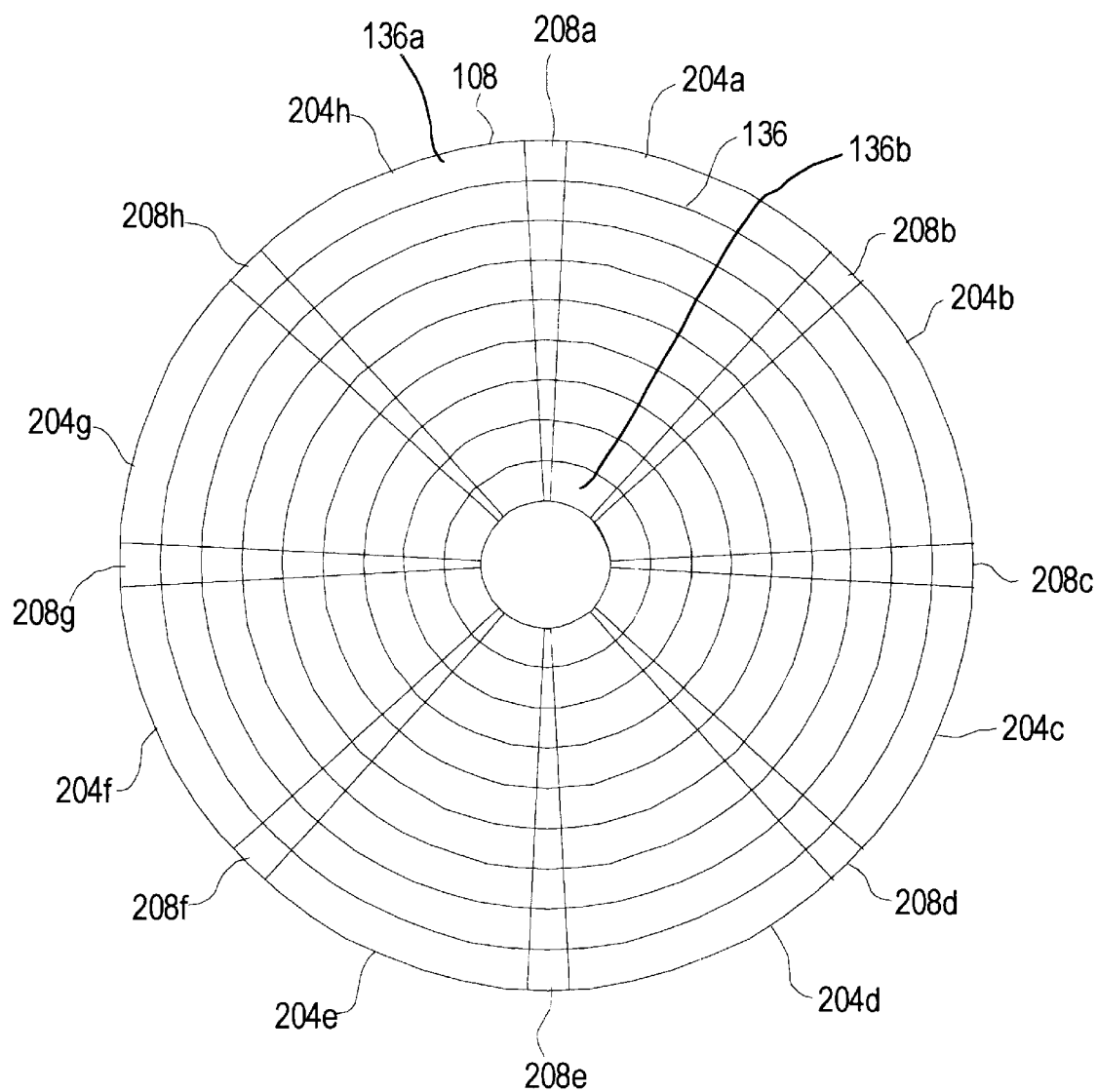
FIG. 2 is a diagrammatic representation of a magnetic storage disk.

With reference now to FIG. 2, a typical arrangement of data tracks 136 on a magnetic disk 108 is illustrated. Usually, the data tracks 136 are divided into data fields 204a–204h with a servo sector 208a–208h between a plurality of data fields 204a–204h. Generally, the data fields 204a–204h are used for storing data as a series of magnetic transitions, while the servo sectors 208a–208h are used for storing servo information, also as a series of magnetic transitions, that is used to provide the transducer head 124 with positioning information. In particular, the servo sectors 208a–208h provide the transducer heads 124 with information concerning their position over the magnetic disk 108. More particularly, the servo sectors 208a–208h provide information to the transducer heads 124 concerning the identity of the track 136 and servo sector 208 over which each transducer head 124 is flying.

Although the magnetic disks 108 illustrated in FIGS. 1 and 2 are illustrated as having a relatively small number of data tracks 136 and servo sectors 208, it can be appreciated that a typical computer disk drive contains a very large number of data tracks and sectors. For example, computer disk drives having over 30,000 tracks per inch and 120 servo sectors are presently available. In addition, alternate configurations of magnetic disks 108 are possible. For example, in a computer disk drive having several magnetic disks 108, a surface of one of the disks 108 may be dedicated to servo information, while the surfaces of the remaining disks 108 are used exclusively to store data.

With continued reference to FIG. 2, it can be appreciated that a servo sector 208 associated with a track 136a having a relatively large radius and located at the outer diameter of the disk 108 occupies a longer piece of the track 136a than does a servo sector 208 associated with a track 136b having a relatively small radius and located at the inner diameter of the disk 108. This is because the length of a track is given by 2πr. Because servo sector data is typically written at a constant frequency across all the tracks 136 of the disk 108, the information contained in a servo sector 208 located in a track 136b at the inner diameter of the disk 108 is more densely packed together than is the information in a servo sector 208 in a track 136a at the outer diameter of the disk 108. As a result, the magnetic flux transitions in a servo sector 208 are closer together at the inner diameter of the disk 108 than they are at the outer diameter of the disk 108. That is, the pulses encoding the information are linearly superimposed. Accordingly, although the frequency with which data is written to and read from the servo sectors 208 by the transducer head 124 is constant across the radius of the disk, the shape of the waveform produced by a given series of magnetic transitions will vary.

The shape of a pulse or signal produced by a particular series of bits will vary depending on the density with which those bits are packed together. In a partial response maximum likelihood (PRML) type detector, the amplitude of a signal is sampled at regular time intervals. A code word symbolized by a set of pulses is then determined using a statistical maximum likelihood or Viterbi process. Accordingly, the shape of a pulse is determinative in decoding a stored code word. PRML-type detectors may include maximum likelihood or Viterbi detectors. The advantage of the PRML type detector is that the density of data, known as the channel bit density (CBD), may be increased as compared to peak detection methods. In general, peak detection methods must detect discrete bits of data, and therefore they are incapable of reliably decoding pulses derived from bits having a density of greater than 1.0, and are therefore so densely packed together that the signal derived from a first bit at the designated sampling time is altered by the bits on either side of the first bit (i.e., by intersymbol interference). In contrast, the PRML type detection method allows for the accurate detection of bits even when the pulse that would be generated by a bit in isolation is altered by its proximity to other bits (i.e., is altered by intersymbol interference due to the linear superposition of the pulses). The ability of a PRML channel to accurately decode signals in the presence of such intersymbol interference allows it to accurately detect bit series even when the channel bit density of the information is high. For instance, according to one embodiment of the present invention, a series of bits may be accurately detected where the isolated-pulse width (PW50) of a signal contains 2.5 bits of information. The isolated-pulse width or PW50 is the distance between the points on the pulse at the intersection between the pulse and a line indicating an amplitude that is equal to 50% of the maximum amplitude of the pulse. Accordingly, a PRML detector allows for servo sector information to be recorded at increased channel bit densities.

The inventor has recognized that the channel bit density varies with the inverse of the radius of the disk 108. Accordingly, as mentioned above, channel bit density is greatest at the inner diameter of the disk 108, and is at a minimum at the outer diameter of the disk 108. Furthermore, the rate of change of the channel bit density from one track to the next is greater between tracks located more towards the inside diameter of the magnetic disk 108 than between tracks located more towards the outside diameter of the magnetic disk 108. Accordingly, in a conventional zoning system, the change in channel bit density across a zone located towards the inside diameter of the disk 108 is greater than the change in channel bit density across a zone located more towards the outside diameter of the disk 108.

Figure 3:
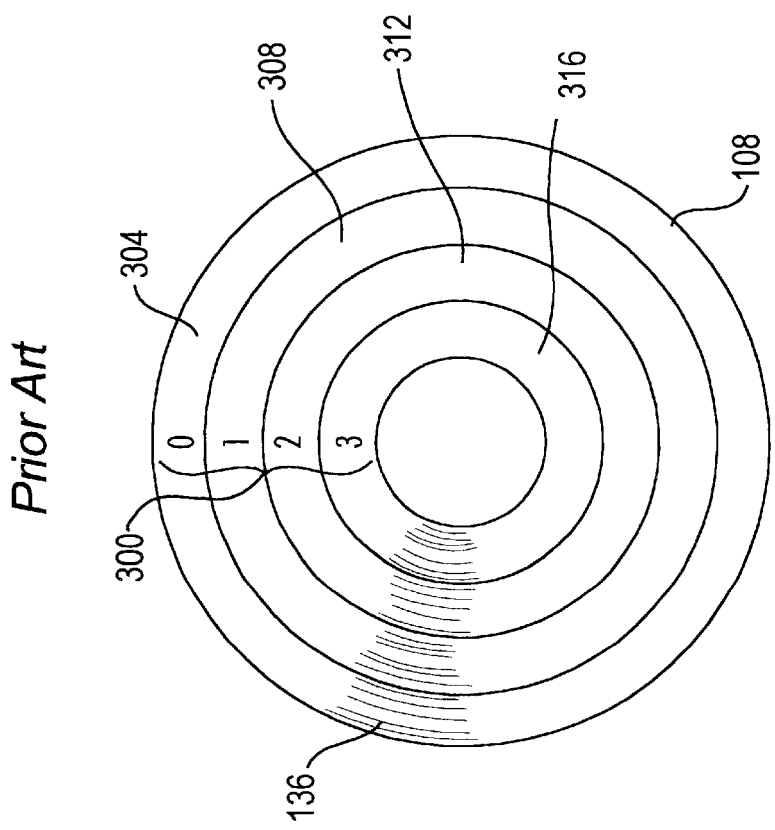
FIG. 3 is a diagrammatic representation of an arrangement of servo sector zones on a magnetic disk according to the prior art.

With reference now to FIG. 3, an arrangement of zones on a disk drive surface 108 according to the prior art is illustrated. In FIG. 3, it can be seen that the surface of the magnetic disk 108 is divided into four zones 300. Zone 0 304 is located at the outer diameter of the disk 108. Moving in from zone 0 304 are zones 1 308, 2 312 and 3 316. Where, for example, the disk 108 illustrated in FIG. 3 contains 20,000 tracks (identified as track 1 to track 20,000), each of the zones 300 would contain 5,000 tracks. That is, typically zones contain the same number of tracks. To illustrate variations in the channel bit density between different zones, assume that the disk has a nominal PW50 of 8 microinches, a radius at an inside diameter of 0.8 inches, a radius at an outside diameter of 1.8 inches, a data rate of 160 megabits per second and an rpm of 7200. If the channel bit density of the innermost track (track 20,000) is about 2.1, the channel bit density of the outer most track (track 15,001) 136 included in zone 3 316 would be about 1.6. In contrast, the channel bit density of the inner most track (track 5,000) 136 included in zone 0 304 would have a channel bit density of about 1.09 while the channel bit density of track 1 136 at the outside diameter of zone 0 304 of the disk 108 would be about 0.94. From the above example, it is apparent that the difference between the channel bit density of track 15,001 and track 20,000 in zone 3 316 is about 0.5, while the difference between the channel bit density of track 1 and track 5,000 in zone 0 304 is about 0.15. Because zone 3 316 and zone 0 304 each contain 5,000 tracks, it can be appreciated that the rate of change of the channel bit density across zone 3 316 is greater than the rate of change of the channel bit density across zone 0 304. The channel bit densities and other features of the zones created according to this example of the prior art are set forth in Table 1.

TABLE 1

| ZONE | LOCATION | CBD | RADIUS | TRACK | Size of Zone | CBD Change |
|---|---|---|---|---|---|---|
| 3 | ID | 2.115 | 0.802600 | 20000 | 4999 | 0.511 |
|   | OD | 1.604 | 1.058321 | 15001 |   |   |
| 2 | ID | 1.604 | 1.058321 | 15000 | 4999 | 0.310 |
|   | OD | 1.294 | 1.311739 | 10001 |   |   |
| 1 | ID | 1.294 | 1.311739 | 10000 | 4999 | 0.207 |
|   | OD | 1.087 | 1.561132 | 5001 |   |   |
| 0 | ID | 1.087 | 1.561132 | 5000 | 4999 | 0.147 |
|   | OD | 0.940 | 1.805370 | 1 |   |   |

Because the channel bit density changes more quickly at an inner diameter of the disk 108, optimizing a filter or equalizer for shaping or conditioning a signal produced by a servo sector having a channel bit density equal to the nominal channel bit density of the tracks included in a particular zone 300 may produce acceptable results in connection with any track located in zone 0 304. However, a filter or equalizer optimized for shaping or conditioning a signal produced from a servo sector having a channel bit density equal to a nominal channel bit density of the tracks in zone 3 may not produce acceptable results in connection with all of the tracks included in zone 3 316. This is because the range of channel bit densities which must be accommodated by a filter and/or equalizer optimized for zone 3 316 is much wider than the range of channel bit densities that must be accommodated by a filter and/or equalizer optimized for zone 0 304. Accordingly, it is apparent that filtering and/or equalizing a signal based on the zone from which the signal is derived is suboptimal where the zones each include a like number of tracks. Indeed, according to conventional zoning methods, zones at an inside diameter of a disk 108 are often subdivided into a number of subzones, with a separate pulse shaping scheme for each subzone, in order to equalize signals such that they can be reliably detected.

Figure 4:
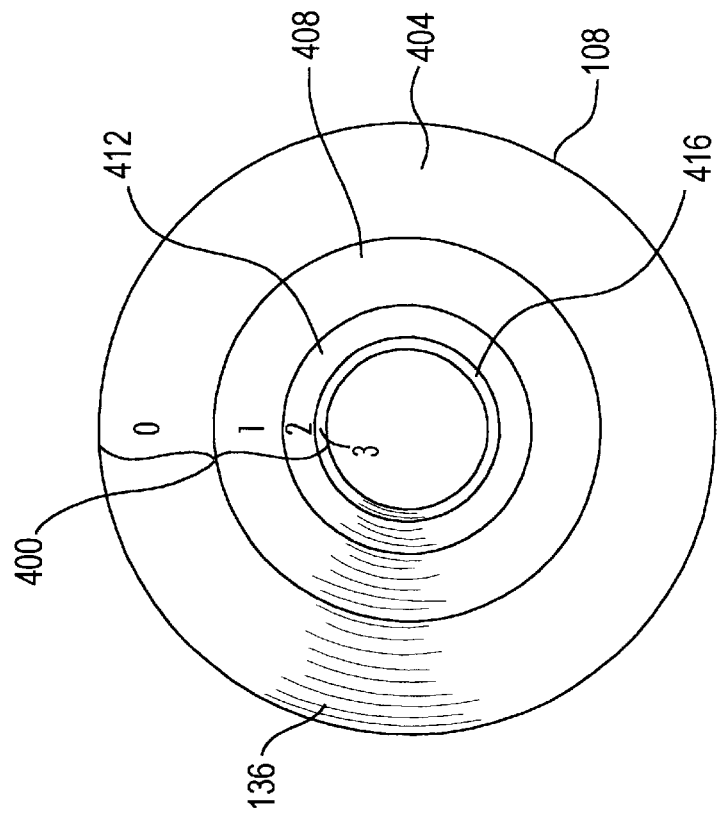
FIG. 4 is a diagrammatic representation of an arrangement of servo sector zones on a disk according to an embodiment of the present invention.

With reference now to FIG. 4, an allocation of zones according to an embodiment of the present invention is illustrated. In FIG. 4, the surface of the magnetic disk 108 is divided into four zones 400. The outer most zone, zone 0 404 contains the greatest number of tracks. Zone 1 408 contains the next largest number of tracks. Following zone 1 408 in number of tracks is zone 2 412. The innermost zone, zone 3 416, contains the fewest tracks. According to one embodiment of the present invention, the number of tracks allocated to each zone is such that the total change in channel bit densities across the width of each of the zones 400 is approximately equal. Furthermore, because the zones 400 are defined by an integer number of tracks, it will be appreciated that it may be impossible to provide zones 400 having ranges of channel bit densities that are precisely equal to one another. However, rounding off to the nearest track is more than adequate due to the resolution limitations of the channel 138, and due to inaccuracies introduced by the mechanical components of the disk drive 100. Indeed, according to the present invention, satisfactory results can be achieved if the differences between the channel bit densities of the zones is within about 5%. More preferably, the ranges of channel bit densities within a zone is within about 0.5% of any other zone.

Figure 5:
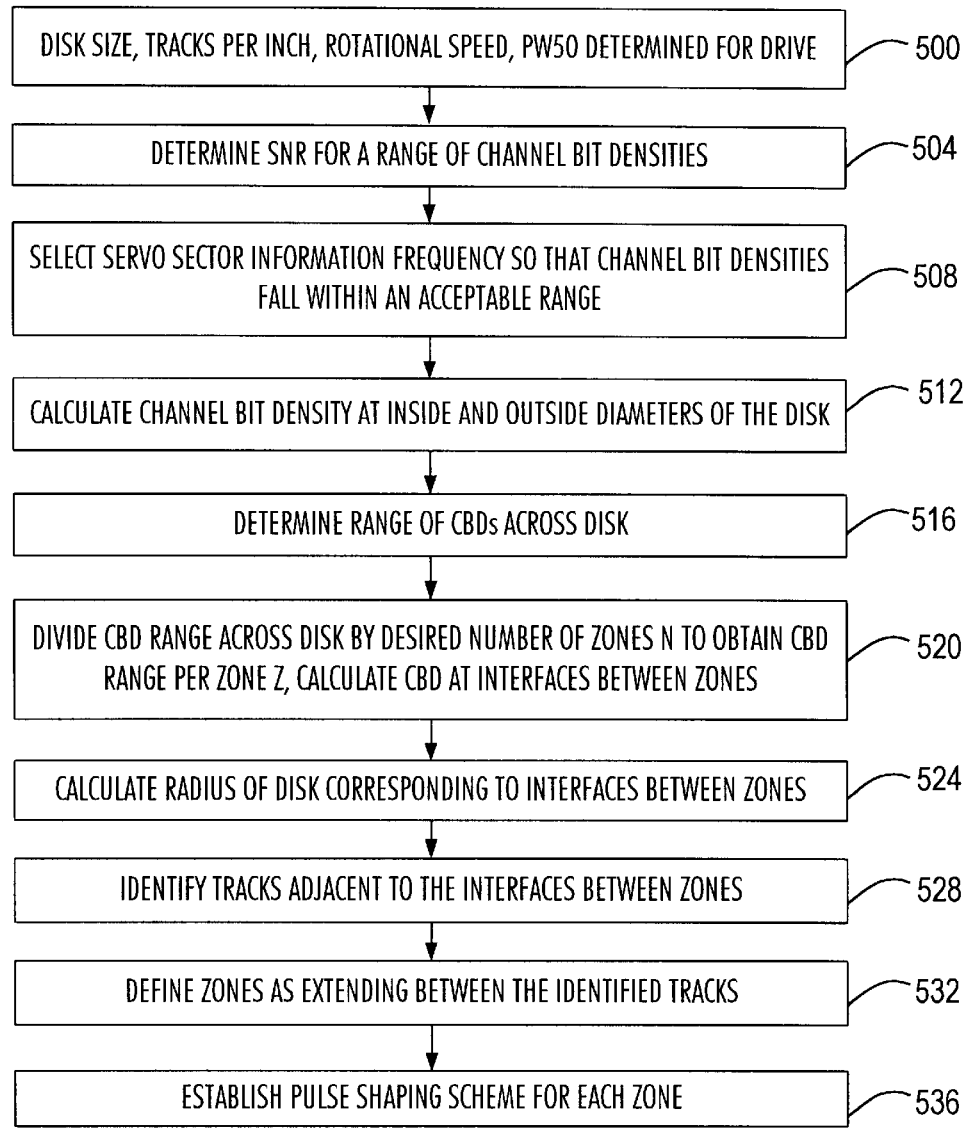
FIG. 5 is a flowchart illustrating a method of servo zoning according to an embodiment of the present invention.

With reference now to FIG. 5, a method for sizing servo sector zones in accordance with an embodiment of the present invention is illustrated. Initially, at step 500, the size of the disk 108, the number of tracks 136 per inch of the disk 108, the rotating speed of the disk 108, and the PW50 for the drive 100 are determined. In general, these values are a function of the size format of the drive 100, the desired data capacity of the disk 108, and the performance and dimensions of the transducer head 124. The signal to noise ratio (SNR) required for a range of channel bit densities is then determined for a given bit error rate, typically around $1e^{-6}$ (step 504). Next, the data rate or frequency of servo sector information is selected so that the channel bit density range for the drive 100 is within an acceptable range (step 508). Having determined the frequency of the servo sector data, the channel bit density at the inside diameter and outside diameter of the disk 108 can be calculated (step 512). According to one embodiment of the present invention, the channel bit density is equal to K/R where $$K = \frac{(PW50)(Mbs)(30)}{(RPM)\pi},$$

where R is the radius in inches of the track for which the channel bit density is being calculated, the PW50 is in micro inches, and "Mbs" refers to the frequency or data rate of the servo sector information in megabits per second. The difference between the channel bit density at the inner diameter and at the outer diameter is then taken to determine the overall range of channel bit densities across the radius of the disk 108 (step 516).

Having obtained the channel bit density range across the disk 108, the optimum channel bit density range per servo sector zone Z can be determined. Specifically, the range of channel bit densities across the radius of the disk 108 is divided by the desired number of servo sector zones N (step 520). The range of channel bit densities per zone Z allows the channel bit densities at an inside diameter and an outside diameter of each of the zones to be calculated. This can be done by starting at the channel bit density for the inner diameter of the disk 108 and subtracting from that value the range of channel bit densities per zone Z to arrive at the channel bit density at the interface between the innermost zone (e.g., zone 3 416) and the next innermost zone (e.g., zone 2 412). The range of channel bit densities per zone Z is then subtracted from the channel bit density at the interface between the innermost and the next innermost zones to obtain the channel bit density at the interface between the next innermost zone (e.g., zone 2 412) and the zone surrounding the next innermost zone (e.g., zone 1 408). This process continues until the channel bit density at the interface between each of the N zones has been determined. Having determined the channel bit densities at the interfaces between the zones 400, the radius of the disk 108 at which the interfaces occur can be calculated, as $$R = \frac{K}{CBD} \text{ (step 524).}$$

At step 528 the two tracks 136 adjacent to each of the interfaces between the zones 400 are, identified. The identity (i.e., the track number) of the tracks defining the extremes of each of the zones 400 can be determined from the calculated radius of the interfaces, the tracks per inch of the disk drive 100 and the radius of the inner diameter of the disk 108. If the distance calculated as corresponding to an interface between zones 400 falls directly on the centerline of a track 136, a decision will have to be made as to which zone 400 the track 136 belongs. However, for purposes of the present invention, it is not critical that the track be allocated to one of the two possible zones 400 in any particular way. This is because the limited resolution of the channel 138 and variations introduced by the mechanical aspects of the disk drive 100 are typically more significant than the signal variation caused by selecting a track that is a few or even a few hundred tracks away from the precise interface between adjacent zones. Having thus identified the tracks 136 adjacent to the zone interfaces, the zones 400 may be defined as extending between the identified tracks 136 (step 532). In this way, zones 400 that each have a range of channel bit densities that is about equal to any of the other zones 400 are defined.

At step 536, the pulse shaping scheme, achieved by the filtration and/or equalization applied to signals derived from servo sectors 208 located in tracks 136 by a detector circuit 600 (FIG. 6) is determined for each of the zones 400. In general, the scheme or criteria according to which signals are filtered and/or equalized (i.e. the pulse shaping scheme) is selected to shape signals before they are provided to the detector such that the likelihood of correctly decoding the signals is maximized, by minimizing the mean square error the channel's 138 detector.

Figure 6:
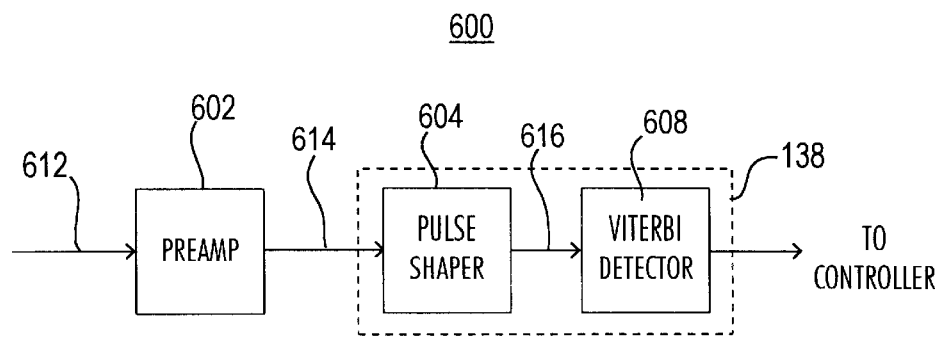
FIG. 6 is a diagrammatic representation of a simplified detector circuit in accordance with an embodiment of the present invention.

With reference now to FIG. 6, a detector circuit 600 in accordance with an embodiment of the present invention is depicted: In general, the detector circuit 600 includes a preamplifier 602, a pulse shaper 604 and a Viterbi detector 608. The preamplifier 602 receives a signal or pulse 612 derived from a servo sector 208 located within one of the zones 400, and provides an amplified signal 614 to the pulse shaper 604. The pulse shaper 604 then shapes or conditions the simplified signal 614 according to the zone 400 from which the signal 612 was derived. That is, the criteria or scheme according to which the amplified signal 614 is shaped is dependent on the zone from which the signal 612 was derived. Accordingly, one pulse shaping scheme is provided for each zone 400, and each scheme is assigned to minimize the mean square error of the detector 608 for the zone. As will be appreciated by those of ordinary skill in the art, the pulse shaper 604 may comprise a filter and/or an equalizer. As will further be appreciated by one of ordinary skill in the art, the pulse shaper 604 may be implemented as part of the firm ware of the channel 138. Accordingly, the pulse shaping schemes provided for each zone may comprise a discrete set of programming code or variables within the programming code. Alternatively or in addition, the pulse shaper 604 may be implemented as an analog filter and/or equalizer. The shaped signal 616 is then provided to the Viterbi detector 608. The filtration and/or equalization of the signal 612 by the pulse shaper 604 results in a conditioned signal 616 that is more likely to be correctly decoded by the Viterbi detector 608 than an unconditioned signal 612 or 614. The detected code 620 is then passed to the controller 132 for further processing. The detected code 620 may be in a Gray code format.

According to one embodiment of the present invention, each pulse shaping scheme is selected so that a signal derived from a servo sector having information encoded at the average channel bit density for the zone 400 is provided to the detector with an ideal shape and amplitude. According to another embodiment of the present invention, each pulse shaping scheme applied by the pulse shaper 604 is not optimized for signals derived from servo sectors 208 located within tracks 136 having a channel bit density equal to the average channel bit density for the corresponding zone. Instead, all or some of the pulse shaping scheme may be optimized for servo sectors 208 located at a middle diameter of the corresponding particular zone. According to still another embodiment of the present invention, each pulse shaping scheme is optimized to detect signals derived from a track 136 having a channel bit density equal to one-half the range of channel bit densities for the corresponding zone. Regardless of the method for selecting a pulse shaping scheme, signals may be derived from a plurality of servo sectors having the chosen channel bit density (i.e. located within the same track). In this way, an average signal is obtained for which the pulse shaping scheme may be optimized.

Although the examples and description set forth herein refer to the division of the disk 108 into four servo sector zones 400, any number of zones may be selected. For instance, where the servo sector 208 information is written at high channel bit densities, the use of more than four zones may be advantageous. Conversely, reducing the number of zones 400 reduces the software or firmware overhead in the channel 138. Specifically, the code used to control the controller 132 may be simplified if relatively fewer zones 400 are specified.

The following examples are provided for purposes of illustration only and are not intended to limit the scope of the invention. In the first example, servo sector zones have been assigned according to an embodiment of the present invention to a disk drive having servo sector data written at a nominal PW50 of 8 microinches, operating at 7200 rpm, having a data rate of 160 Mbs, a radius at an inside diameter of 0.8 inches and a radius at an outside diameter of 1.75 inches. Table 2 summarizes the zone, channel bit density, radius and track included in each zone for the drive. As shown in Table 2, the channel bit density range Z for each zone is approximately 0.294.

TABLE 2

| ZONE | LOCATION | CBD | RADIUS | TRACK | SIZE OF ZONE | CBD Change |
|---|---|---|---|---|---|---|
| 3 | ID | 2.115 | 0.802600 | 20000 | | |
|   | OPTIMIZED | 1.968 | 0.862482 | 18831 | 2527 | 0.294 |
|   | OD | 1.821 | 0.932020 | 17473 | | |
| 2 | ID | 1.821 | 0.932020 | 17472 | | |
|   | OPTIMIZED | 1.675 | 1.013754 | 15874 | 3510 | 0.293 |
|   | OD | 1.528 | 1.111201 | 13963 | | |
| 1 | ID | 1.528 | 1.111201 | 13962 | | |
|   | OPTIMIZED | 1.381 | 1.229376 | 11633 | 5234 | 0.294 |
|   | OD | 1.234 | 1.375677 | 8727 | | |
| 0 | ID | 1,234 | 1.375577 | 8726 | | |
|   | OPTIMIZED | 1.087 | 1.561502 | 4991 | 8726 | 0.294 |
|   | OD | 0.940 | 1.805370 | 1 | | |

Figure 7:
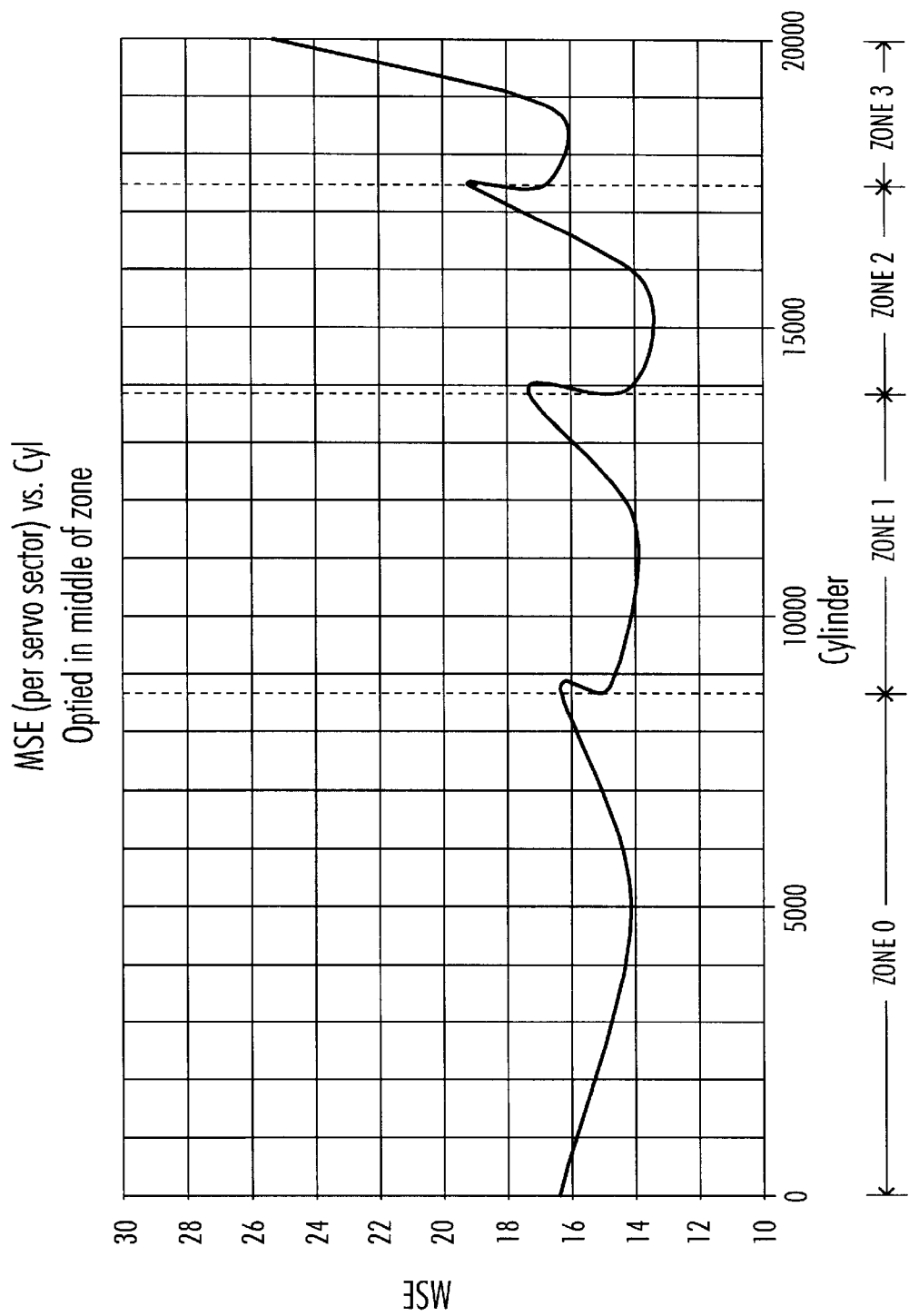
FIG. 7 is a graph illustrating the mean square error in a detector circuit in accordance with an embodiment of the present invention.

With reference now to FIG. 7, the mean square error (MSE) versus the track number for a disk drive 100 that is divided into four zones and having pulse shaping schemes optimized for the middle track of each zone according to an embodiment of the present invention is illustrated. As is known by those of ordinary skill in the art, the mean square error is related to the difference between the expected signal and the signal actually detected. In FIG. 7, zone 0 extends from track 1 to track 8726, zone 1 extends from track 8727 to track 13962, zone 2 extends from track 13963 to track 17472, and zone 3 extends from track 17473 to track 20000. As can be seen from FIG. 7, the MSE within each of the zones is relatively limited. In particular, the maximum MSE is less than about 26.

Figure 8:
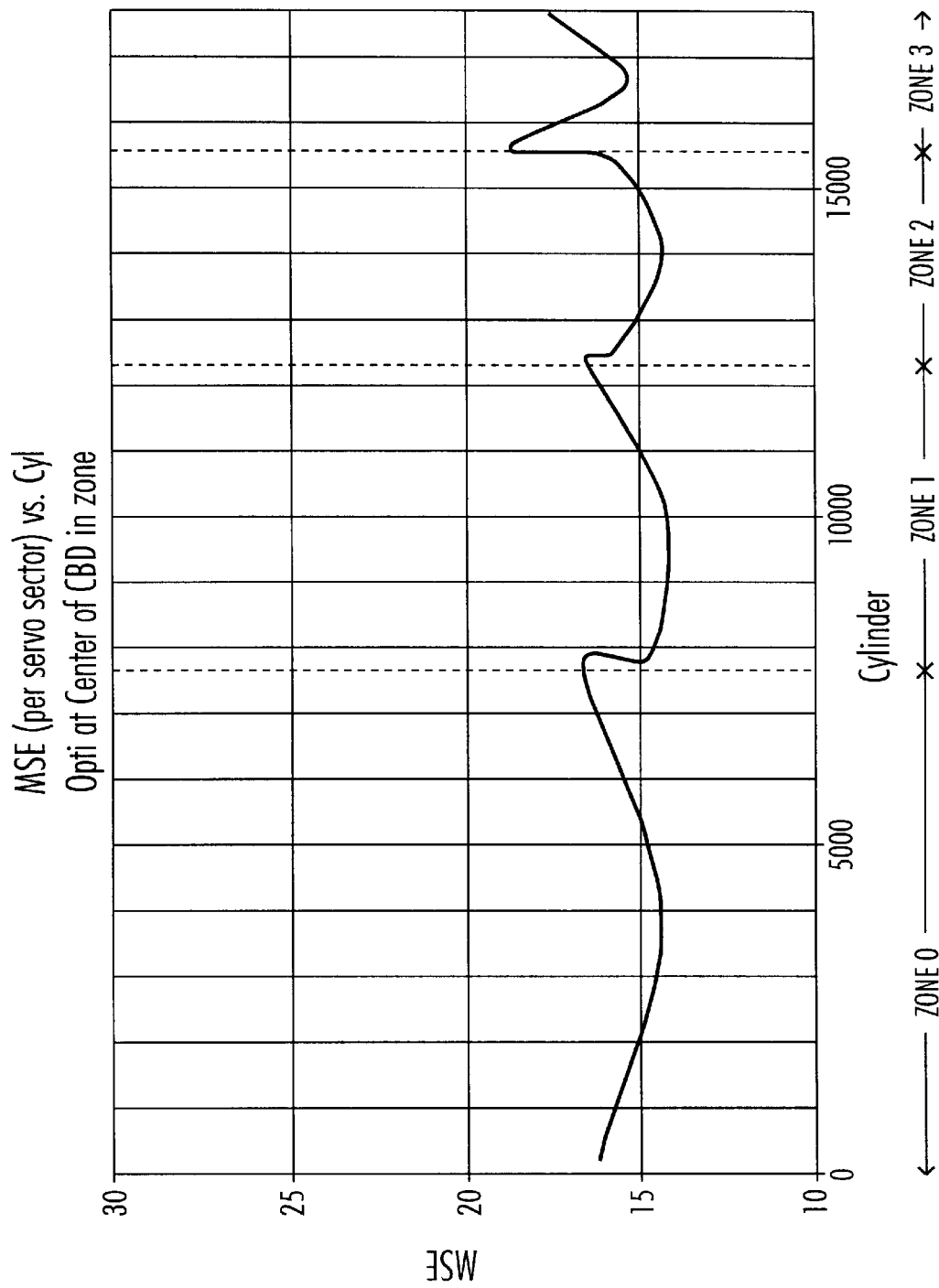
FIG. 8 is a graph illustrating the mean square error in a detector circuit in accordance with another embodiment of the present invention.

With reference now to FIG. 8, the MSE versus the track number is illustrated for a number of sectors according to a disk drive 100 in accordance with another embodiment of the present invention. The data illustrated in FIG. 8 relates to a disk drive 100 having the same arrangement of zones as the disk drive 100 that relates to FIG. 7. However, the drive in FIG. 8 has a pulse shaper 604 having a pulse shaping scheme that has been optimized for signals derived from a track having a channel bit density equal to the middle channel bit density for its respective zone. As compared to the drive of FIG. 7, the drive of FIG. 8 has a MSE that is generally lower, indicating improved detector performance. In particular, the maximum MSE illustrated in FIG. 8 is less than about 19.

Figure 9:
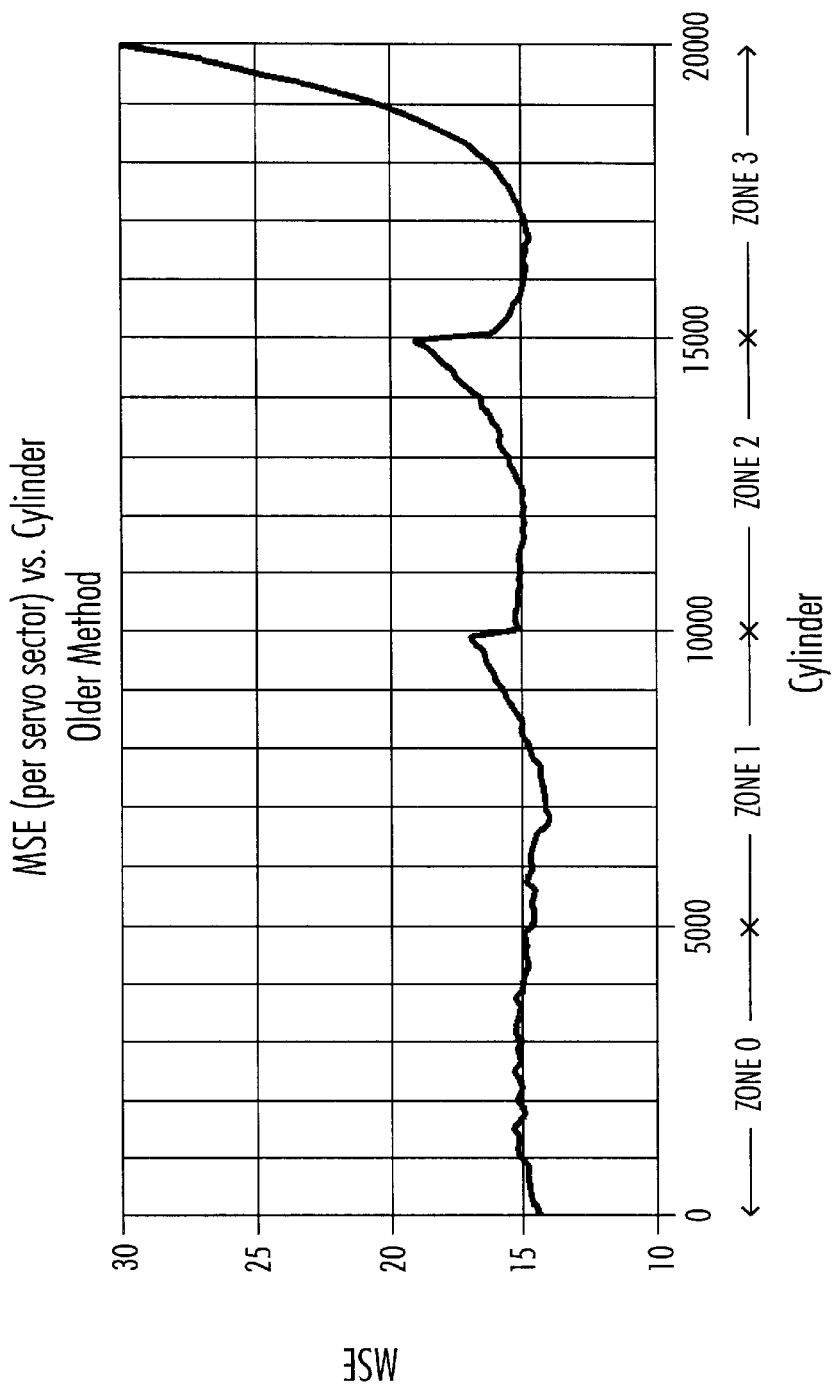
FIG. 9 is a graph depicting the mean square error in a detector circuit in a prior art disk drive.

With reference now to FIG. 9, the MSE versus the track number is plotted for a disk drive constructed in accordance with the prior art and divided into four servo sector zones that each contain an equal number of tracks. As can be seen from FIG. 9, the MSE increases dramatically towards the inside diameter (i.e., towards the higher track numbers) of the disk. In addition, the MSE is generally higher than the MSE for a disk drive 100 constructed in accordance with the present invention, such as those illustrated in FIGS. 7 and 8. In particular, the maximum MSE for the disk drive 100 divided into servo sector zones according to the prior art is about 30.

Of course, the actual MSE of a channel 138 will depend on the detector 608, the scheme according to which the servo sector information is encoded, and other parameters. However, as illustrated in FIGS. 7–9, for a given channel 138, the zoning of the disk drive 100 can be used to decrease the MSE of the channel 138. In particular, zoning according to the present invention in a given disk drive 100 offers decreased MSE as compared to an identical disk drive zoned according to conventional methods.

According to the present invention, a method and apparatus for providing a hard disk drive with improved detector performance are provided. In particular, the present invention provides a method and apparatus for improving the detection of servo sector information by ensuring that the change in channel bit densities across each servo sector zone is about equal from zone to zone.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for allocating servo sector zones in a rotating storage device, comprising:
    providing a magnetic disk having a plurality of tracks, including an inner track at an inside diameter of said disk and an outer track at an outside diameter of said disk;
    calculating a channel bit density of servo sector information at said inner track;
    calculating a channel bit density of servo sector information at said outer track;
    calculating an overall range of channel bit densities, wherein said overall range is equal to the difference in channel bit densities between said-channel bit densities at said inner and outer tracks; and
    dividing said range into N zones, each having a range Z of channel bit densities that are about equal to one another, and wherein all tracks in said N zones are designed to have an equal number of servo sectors.

2. The method of claim 1, further comprising:
    defining a first zone as extending from said inner track to a first interior track, wherein a channel bit density of servo sector information associated with said first interior track is about equal to said channel bit density at said inner track minus Z; and
    defining an Nth zone as extending from said outer track to an $(N-1)^{th}$ interior track, wherein a channel bit density of servo sector information associated with said $(N-1)^{th}$ interior track is about equal to said channel bit density at said outer track plus Z.

3. The method of claim 1, further comprising shaping a signal derived from servo sector information located within one of said N zones according to a corresponding one of N pulse shaping schemes.

4. The method of claim 3, wherein said pulse shaping schemes comprise N filters.

5. The method of claim 3, wherein each of said N pulse shaping schemes is optimized to detect a signal derived from servo sector information associated with a track having a middle channel bit density for its corresponding zone.

6. The method of claim 3, wherein each of said N pulse shaping schemes is optimized to detect a signal derived from servo sector information associated with a middle track located within its corresponding zone.

7. The method of claim 3, wherein at least a first of said N pulse shaping schemes is optimized to detect a signal derived from servo sector information associated with a track located within a corresponding first of said zones having a channel bit density about equal to an average channel bit density in said first zone.

8. The method of claim 3, wherein at least a first of said N pulse shaping schemes is optimized to detect a signal derived from servo sector information associated with a middle track within a corresponding first of said zones.

9. The method of claim 3, wherein at least a first of said N pulse shaping schemes is optimized to detect a signal derived from servo sector information associated with a track located within a first of said zones having a channel bit density about equal to a middle channel bit density of said first zone, and wherein at least a second of said N pulse shaping schemes is optimized to detect a signal from servo sector information associated with a middle track of a second of said zones.

10. The method of claim 3, wherein at least a first of said N pulse shaping schemes is optimized to detect a signal derived from servo sector information associated with a track located within a first of said zones having a channel bit density about equal to an average channel bit density of said first zone, and wherein at least a second of said N filters is optimized to detect a signal from servo sector information associated with a middle track of a second of said zones.

11. The method of claim 3, further comprising providing said shaped signal to a detector.

12. The method of claim 11, wherein said detector is a partial response maximum likelihood type detector.

13. The method of claim 11, wherein said detector is a Viterbi detector.

14. The method of claim 1, wherein said servo sector information is written such that a frequency of a signal derived from said information is the same for each servo sector.

15. A method for optimizing the detection of servo-sector gray code in a hard disk drive, comprising:
    providing a magnetic disk having a plurality of tracks, including a first track at an inside diameter of said disk and a second track at an outside diameter of said disk;
    selecting a number of servo sector zones;
    calculating a first channel bit density, wherein said first channel bit density is a channel bit density of servo sector information associated with said first track;
    calculating a second channel bit density, wherein said second channel bit density is a channel bit density of servo sector information associated with said second track;
    calculating a difference between said first and second channel bit densities;
    dividing said difference between said first and second channel bit densities by said selected number of servo sector zones to obtain a channel bit density range per zone; and
    defining a first zone as extending from said first track to a third track, wherein a channel bit density of said third track is equal to said channel bit density of said first track minus said channel bit density range per zone.

16. The method of claim 15, further comprising:
    defining a second zone as extending from said third track to a fourth track, wherein a channel bit density of said fourth track is equal to said channel bit density of said third track minus said channel bit density per zone.

17. The method of claim 16, further comprising:
    shaping a signal derived from a track located within said first zone according to at least a first criterion; and shaping a signal derived from a track located within said second zone according to at least a second criterion.

18. The method of claim 17, wherein said at least a first criterion is optimized for shaping a signal from a track having a channel bit density about equal to a middle channel bit density of said first zone.

19. The method of claim 17, wherein said at least a first criterion is optimized for shaping a signal from a track having a channel bit density about equal to an average channel bit density of said first zone.

20. The method of claim 17, wherein said first criterion is optimized for shaping a signal from a track located at a middle diameter of said first zone.

21. The method of claim 17, further comprising providing said signals to a detector.

22. The method of claim 21, wherein said detector is a Viterbi detector.

23. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein said N pulse shaping schemes comprise N filters.

24. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein each of said N pulse shaping schemes is optimized to detect a signal derived from servo sector information associated with a track having a middle channel bit density for its corresponding zone.

25. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein each of said N pulse shaping schemes is optimized to detect a signal derived from servo sector information associated with a middle track located within its corresponding zone.

26. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein at least a first of said N pulse shaping schemes is optimized to detect a signal derived from servo sector information associated with a track located within a corresponding first of said zones having a channel bit density about equal to an average channel bit density in said first zone.

27. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein at least a first of said N pulse shaping schemes is optimized to detect a signal derived from servo sector information associated with a middle track within a corresponding first of said zones.

28. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein at least a first of said N pulse shaping schemes is optimized to detect a signal derived from servo sector information associated with a track located within a first of said zones having a channel bit density about equal to a middle channel bit density of said first zone, and wherein at least a second of said N pulse shaping schemes is optimized to detect a signal from servo sector information associated with a middle track of a second of said zones.

29. A method for allocating servo sector zones in a rotating storage device, comprising:

providing a magnetic disk having a plurality of tracks, including an inner track at an inside diameter of said disk and an outer track at an outside diameter of said disk;

calculating a channel bit density of servo sector information at said inner track;

calculating a channel bit density of servo sector information at said outer track;

calculating an overall range of channel bit densities, wherein said overall range is equal to the difference in channel bit densities between said channel bit densities at said inner and outer tracks;

dividing said range into N zones, each having a range Z of channel bit densities that are about equal to one another; and shaping a signal derived from servo sector information located within one of said N zones according to a corresponding one of N pulse shaping schemes, wherein at least a first of said N pulse shaping schemes is optimized to detect a signal derived from servo sector information associated with a track located within a first of said zones having a channel bit density about equal to an average channel bit density of said first zone, and wherein at least a second of said N filters is optimized to detect a signal from servo sector information associated with a middle track of a second of said zones.

30. A disk drive having optimized servo sector zones, comprising:

a base;

a magnetic storage disk assembly mounted to said base, wherein data is stored on said storage disk magnetically in concentric tracks, wherein said tracks each contain a plurality of servo sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track;

a detector; and a channel for transmitting a signal from said transducer head to said detector, wherein a signal read by said transducer head and derived from at least a first servo sector located in a first zone is conditioned according to a first scheme, wherein a signal read by said transducer head and derived from at least a second servo sector located in a second zone is conditioned according to a second scheme, wherein said first zone is located towards an outer diameter of said magnetic storage disk, wherein said second zone is located towards an inner diameter of said magnetic storage disk, wherein said first zone contains more tracks than said second zone, and wherein said first scheme is optimized for a signal derived from a servo sector associated with a track located at a middle diameter of said first zone.

31. A disk drive having optimized servo sector zones, comprising:

a base;

a magnetic storage disk assembly mounted to said base, wherein data is stored on said storage disk magnetically in concentric tracks, wherein said tracks each contain a plurality of servo sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track;

a detector; and a channel for transmitting a signal from said transducer head to said detector, wherein a signal read by said transducer head and derived from at least a first servo sector located in a first zone is conditioned according to a first scheme, wherein a signal read by said transducer head and derived from at least a second servo sector located in a second zone is conditioned according to a second scheme, wherein said first zone is located towards an outer diameter of said magnetic storage disk, wherein said second zone is located towards an inner diameter of said magnetic storage disk, wherein said first zone contains more tracks than said second zone, and wherein said first scheme is optimized for a signal derived from a servo sector associated with a track having a channel bit density equal to an average channel bit density of said first zone.

32. A disk drive having optimized servo sector zones, comprising:

a base;

a magnetic storage disk assembly mounted to said base, wherein data is stored on said storage disk magnetically in concentric tracks, wherein said tracks each contain a plurality of servo sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track;

a detector; and a channel for transmitting a signal from said transducer head to said detector, wherein a signal read by said transducer head and derived from at least a first servo sector located in a first zone is conditioned according to a first scheme, wherein a signal read by said transducer head and derived from at least a second servo sector located in a second zone is conditioned according to a second scheme, wherein said first zone is located towards an outer diameter of said magnetic storage disk, wherein said second zone is located towards an inner diameter of said magnetic storage disk, wherein said first zone contains more tracks than said second zone, and wherein said second scheme is optimized for a signal derived from a servo sector associated with a track located at a middle diameter of said second zone.

33. A disk drive having optimized servo sector zones, comprising:

a base;

a magnetic storage disk assembly mounted to said base, wherein data is stored on said storage disk magnetically in concentric tracks, wherein said tracks each contain a plurality of servo sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track;

a detector; and a channel for transmitting a signal from said transducer head to said detector, wherein a signal read by said transducer head and derived from at least a first servo sector located in a first zone is conditioned according to a first scheme, wherein a signal read by said transducer head and derived from at least a second servo sector located in a second zone is conditioned according to a second scheme, wherein said first zone is located towards an outer diameter of said magnetic storage disk, wherein said second zone is located towards an inner diameter of said magnetic storage disk, wherein said first zone contains more tracks than said second zone, and wherein said second scheme is optimized for a signal derived from a servo sector associated with a track having a channel bit density equal to an average channel bit density of said second zone.

34. A disk drive having optimized servo sector zones, comprising:

a base;

a magnetic storage disk assembly mounted to said base, wherein data is stored on said storage disk magnetically in concentric tracks, wherein said tracks each contain a plurality of servo sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track;

a detector; and a channel for transmitting a signal from said transducer head to said detector, wherein a signal read by said transducer head and derived from at least a first servo sector located in a first zone is conditioned according to a first scheme, wherein a signal read by said transducer head and derived from at least a second servo sector located in a second zone is conditioned according to a second scheme, wherein said first zone is located towards an outer diameter of said magnetic storage disk, wherein said second zone is located towards an inner diameter of said magnetic storage disk, wherein said first zone contains more tracks than said second zone, and wherein said second scheme is optimized for a signal derived from a servo sector associated with a track having a channel bit density equal to a middle channel bit density of said second zone.

35. A disk drive having optimized servo sector zones, comprising:

a base;

a magnetic storage disk assembly mounted to said base, wherein data is stored on said storage disk magnetically in concentric tracks, wherein said tracks each contain a plurality of servo sectors;

an actuator arm pivotally mounted to said base;

a transducer head mounted to a first end of said actuator arm, wherein said transducer head is capable of reading information from and writing information to said magnetic storage disk;

a voice coil motor for moving said first end of said actuator arm radially across said magnetic storage disk, wherein said transducer head is capable of addressing said concentric tracks;

a controller for actuating said voice coil motor to position said transducer head over a selected concentric track;

a detector; and a channel for transmitting a signal from said transducer head to said detector, wherein a signal read by said transducer head and derived from at least a first servo sector located in a first zone is conditioned according to a first scheme, wherein a signal read by said transducer head and derived from at least a second servo sector located in a second zone is conditioned according to a second scheme, wherein said first zone is located towards an outer diameter of said magnetic storage disk, wherein said second zone is located towards an inner diameter of said magnetic storage disk, wherein said first zone contains more tracks than said second zone, and wherein a range of channel bit densities of said first zone is about equal to a range of channel bit densities of said second zone.

* * * * *